Aug. 14, 1934.  A. T. SWEET ET AL  1,969,769
PROCESS OF EXTRACTING METALS FROM ORES
Original Filed Sept. 23, 1929
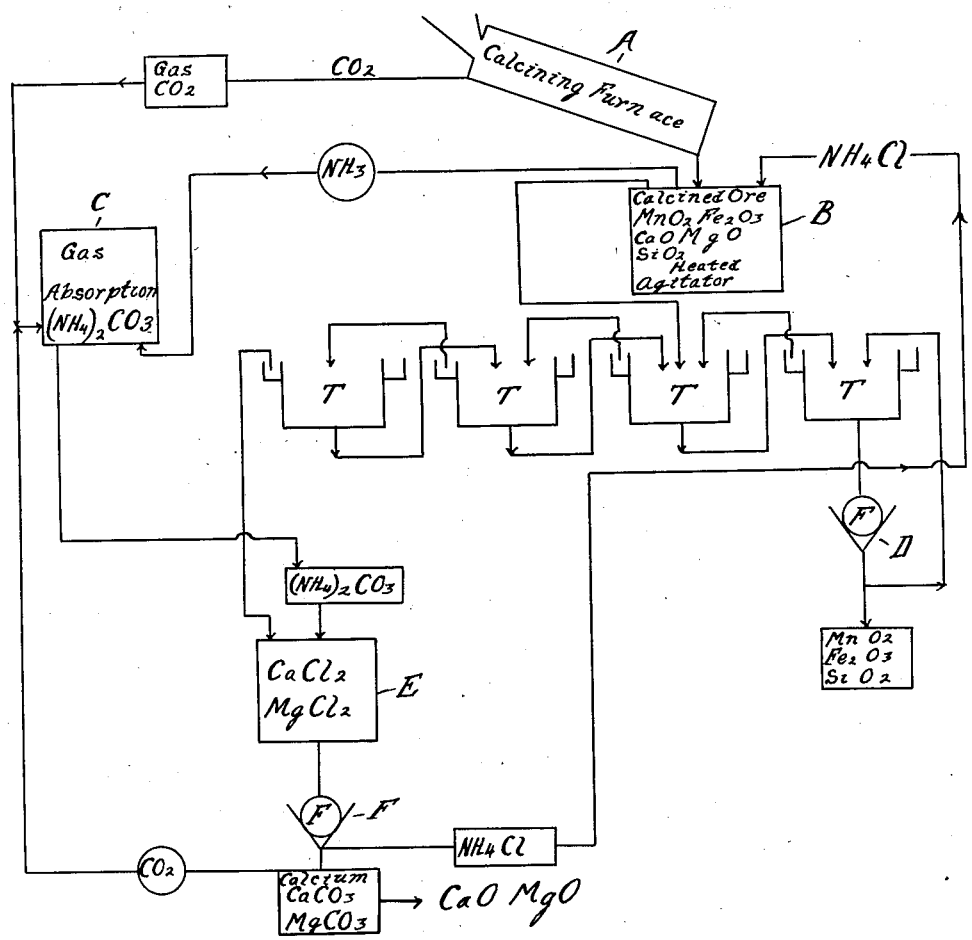
INVENTORS
Andrew T. Sweet
John D. MacCarthy
BY
Whittemore Hulbert
Whittemore & Belknap
ATTORNEYS

Patented Aug. 14, 1934

1,969,769

UNITED STATES PATENT OFFICE

1,969,769

PROCESS OF EXTRACTING METALS FROM ORES

Andrew T. Sweet, Houghton, and John D. MacCarthy, Detroit, Mich., assignors to General Manganese Corporation, Detroit, Mich., a corporation of Delaware Application September 23, 1929, Serial No. 394,680
Renewed March 1, 1932

8 Claims. (Cl. 75—18)

The invention relates to the beneficiating of ores such as manganese ores and ores of other metals and consists in the novel method of separating from the ore certain constituents thereof so as to reduce the bulk and weight of the remaining material which contains the desired metal. The invention further consists in the elimination from the ore of constituents which are difficult to separate from the manganese or other desired metal thereby facilitating the subsequent separation of this metal.

As a specific example of an ore which may be thus beneficiated is one of the following analysis:

| | | Percent |
|---|---|---|
| Dried 212° | Mn | 16.00 |
| | Fe | 11.00 |
| | P | .429 |
| | $SiO_2$ | 13.00 |
| | MgO | 1.80 |
| | CaO | 15.00 |
| | $Al_2O_3$ | 2.70 |
| | $CO_2$ loss | 26.00 |

In this ore the manganese, iron, magnesium and calcium are in the form of insoluble carbonates.

As shown by the flow sheet of the accompanying drawing, the first step of our improved process is the calcining of this ore to convert all of the carbonates into oxides. This step may be carried out in a furnace A and the material is then treated at B with a solution of ammonium salt such as ammonium chloride which converts the calcium and magnesium oxides into soluble chlorides with the evolution of ammonia gas, which latter is commingled in an absorption tower C with the carbon dioxide gas liberated in the calcining furnace, thereby forming ammonium carbonate. From B the material passes through a series of agitators T and finally the solution is separated from the solid material at D. This solution is then treated at E with the ammonium carbonate to convert the calcium and magnesium chloride into carbonates which are separated at F. This reforms the ammonium chloride which is returned for repeating the cycle.

Due to the fact that the calcium and magnesium are removed from the ore the latter is beneficiated and at the same time is placed in a condition where the manganese may be extracted by flotation methods or by any of the known leaching methods.

What we claim as our invention is:

1. The process of beneficiating ores containing manganese, magnesium and calcium as carbonates which consists in calcining the ore to convert the carbonates to oxides with the displacement and collection of the carbon dioxide gas, leaching the calcined ore with a solution of ammonium salt which converts the magnesium and calcium oxides into soluble salts with the evolution of ammonia gas, separating the soluble salts from the insoluble constituents, collecting the ammonia gas and combining the same with carbon dioxide gas to form ammonium carbonate, treating the separated solution with ammonium carbonate to precipitate the calcium and magnesium content as carbonates with the reformation of the original ammonium salt and utilizing the latter to repeat the cycle.

2. The process of beneficiating carbonate ores containing a manganese compound and a compound of an alkaline earth metal comprising the oxidizing of the ore to convert the carbonates to oxides with the displacement and collection of carbon dioxide gas, leaching the oxidized ore with an ammonium salt which dissolves the alkaline earth metal oxide but not the manganese oxide and separating the solution from the solid matter, leaving the insoluble manganese oxide in the latter free from the alkaline earth metal compound.

3. The process of beneficiating carbonate ores containing a manganese compound and a compound of an alkaline earth metal comprising the oxidation of the ore to convert the carbonates to oxides with the displacement and collection of carbon dioxide gas, leaching the oxidized ore with a solution of an ammonium compound which converts the alkaline earth metal oxide into the corresponding soluble salt with the evolution of ammonia gas, leaving the manganese in the form of an insoluble oxide, separating the soluble salts from the insoluble constituents, collecting the ammonia gas and combining the same with carbon dioxide gas to form ammonium carbonate, treating the separated solution with ammonium carbonate to precipitate the alkaline earth metal content as a carbonate with the reformation of the original ammonium salt and utilizing the latter to repeat the cycle.

4. The process of beneficiating a metallurgical product containing a compound of an alkaline earth metal and a compound of a metal of the class consisting of iron and manganese, which process comprises calcining the metallurgical product to produce the oxide of the alkaline earth metal, leaching the calcined product with an ammonium salt which dissolves the alkaline earth metal oxide but not the calcined compound of the metal of the class consisting of iron and manganese, thereby forming the corresponding soluble salt of the alkaline earth metal with the evolution of ammonia gas, separating the soluble alkaline earth metal salt from the insoluble material, treating the soluble alkaline earth metal salt with ammonia and carbon dioxide gases thereby precipitating the alkaline earth metal carbonate with the regeneration of the original ammonium salt and utilizing the latter to repeat the cycle.

5. The process of beneficiating a metallurgical product containing a compound of an alkaline earth metal and a compound of a metal of the class consisting of iron and manganese, which process comprises calcining the metallurgical product to produce the oxide of the alkaline earth metal, leaching the calcined metallurgical product with ammonium chloride, thereby forming the soluble chloride of the alkaline earth metal with the evolution of ammonia gas, separating said soluble alkaline earth metal chloride from the insoluble material, treating said soluble alkaline earth metal chloride with ammonia and carbon dioxide gases thereby precipitating the alkaline earth metal carbonate and regenerating ammonium chloride and utilizing the latter to repeat the cycle.

6. The process of beneficiating a metallurgical product containing a carbonate, a compound of an alkaline earth metal and a compound of a metal of the class consisting of iron and manganese, which process comprises calcining the metallurgical product to produce the oxide of the alkaline earth metal with the evolution of carbon dioxide, leaching the calcined product with ammonium chloride, thereby forming soluble alkaline earth metal chloride with the evolution of ammonia gas, separating the soluble alkaline earth metal chloride from the insoluble material, treating the soluble alkaline earth metal chloride with the ammonia and carbon dioxide gases thereby precipitating the alkaline earth metal carbonate with the regeneration of ammonium chloride and utilizing the latter to repeat the cycle.

7. The process of beneficiating a metallurgical product containing a manganese compound and an alkaline earth metal compound, which process comprises calcining the product to produce the oxide of the alkaline earth metal, leaching with ammonium chloride, thereby forming soluble alkaline earth metal chloride with the evolution of ammonia gas, separating the soluble alkaline earth metal chloride from the insoluble compound of manganese, treating said soluble alkaline earth metal chloride with ammonia and carbon dioxide gases to precipitate the alkaline earth metal carbonate with the regeneration of ammonium chloride and utilizing the latter to repeat the cycle.

8. The process of beneficiating a carbonate ore containing a manganese compound, an iron compound, lime, magnesia and silica comprising calcining said ore to remove carbon dioxide, leaching the calcined ore with ammonium chloride, thereby forming soluble calcium chloride and magnesium chloride with the evolution of ammonia, separating the soluble calcium and magnesium chlorides from the insoluble manganese, iron and silicon compounds, treating the calcium and magnesium chlorides with ammonia and carbon dioxide gases thereby precipitating calcium and magnesium carbonates with the regeneration of ammonium chloride and utilizing the latter to repeat the cycle.

ANDREW T. SWEET.
JOHN D. MacCARTHY.